(12) United States Patent
Tu et al.

(10) Patent No.: US 9,292,121 B2
(45) Date of Patent: Mar. 22, 2016

(54) ADAPTIVE SAMPLING APPARATUS

(75) Inventors: Yen-Hung Tu, Taipei (TW); Chung-Lin Chia, Taipei (TW); Han-Chang Chen, Taipei (TW); Wen-Chieh Pan, Taipei (TW)

(73) Assignee: Rich IP Technology Inc., Taipei (TW)

( * ) Notice: Subject to any disclaimer, the term of this patent is extended or adjusted under 35 U.S.C. 154(b) by 381 days.

(21) Appl. No.: 13/425,763

(22) Filed: Mar. 21, 2012

(65) Prior Publication Data

US 2013/0194203 A1   Aug. 1, 2013

(30) Foreign Application Priority Data

Jan. 31, 2012   (TW) .............................. 101102980 A

(51) Int. Cl.
   *G06F 3/041*   (2006.01)
(52) U.S. Cl.
   CPC .................................... *G06F 3/0416* (2013.01)

(58) Field of Classification Search
   None
   See application file for complete search history.

(56) References Cited

U.S. PATENT DOCUMENTS 5,977,957 A * 11/1999 Miller et al. .................. 345/174
2005/0179671 A1 * 8/2005 DeGroot et al. .............. 345/173

\* cited by examiner

*Primary Examiner* — David D Davis
(74) *Attorney, Agent, or Firm* — Tracy M. Heims; Apex Juris, PLLC

(57) ABSTRACT

An adaptive sensing apparatus, including: a sensor array, having N sensing points, wherein N is a positive integer; a driver unit, coupled with the sensor array; and a control unit, coupled with the driver unit; wherein the control unit has at least one adaptive sampling modes for controlling the driver unit to drive the sensor array and derive M sensed data, wherein M is a positive integer and M<N.

20 Claims, 8 Drawing Sheets

| $A_1$ | $B_1$ | $A_2$ | $B_2$ |
|---|---|---|---|
| $C_1$ | $D_1$ | $C_2$ | $D_2$ |
| $A_3$ | $B_3$ | $A_4$ | $B_4$ |
| $C_3$ | $D_3$ | $C_4$ | $D_4$ |

FIG. 3

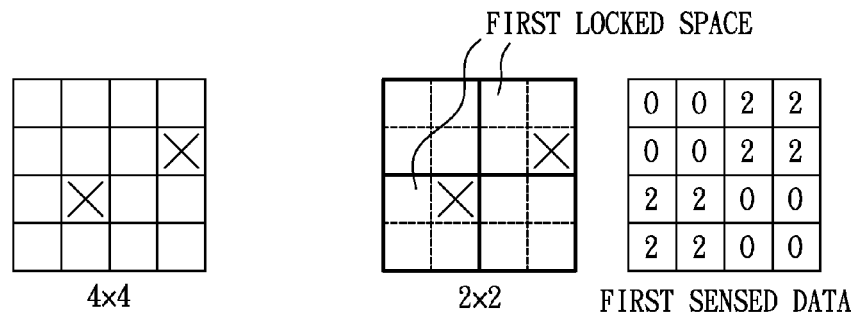
FIG. 4(a)   FIG. 4(b)
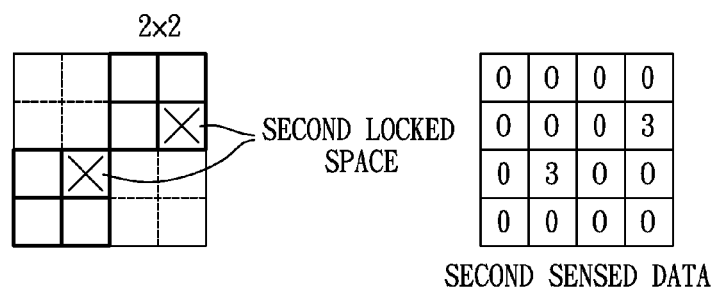
FIG. 4(c)
| 0 | 0 | 2 | 2 |
| 0 | 0 | 2 | 5 |
| 2 | 5 | 0 | 0 |
| 2 | 2 | 0 | 0 |
OUTPUT SENSED DATA
FIG. 4(d)

ADAPTIVE SAMPLING APPARATUS

BACKGROUND OF THE INVENTION

1. Field of the Invention

The present invention relates to a sensing apparatus, especially to an adaptive sensing apparatus, which is capable of providing different adaptive sampling modes according to different touch operation requirements, so as to reduce the quantity of sensed data.

2. Description of the Related Art

Prior art touch sensing apparatuses generally use a fixed resolution to scan a fixed touch plane repeatedly. However, when the fixed touch plane is large, the scan time is likely to be long accordingly. If the scan time is too long, it can happen that the motion of a touching object—a finger, for example—becomes undetectable. For this issue, the fixed resolution may be reduced to shorten the scan time. However, with the fixed resolution reduced, the discrimination of neighboring touching objects may fail. In addition, when the fixed touch plane is large, the resulting large amount of sensed data will prolong the response time of a prior art touch sensing apparatus, and that can also make the prior art touch sensing apparatus fail to keep up with a moving touching object.

Besides, some APPs (application programs) provide touch operation functions only on local regions of a view area, but prior art touch sensing apparatuses still scan the whole touch plane repeatedly with a fixed resolution, making the scan process cumbersome and inefficient. This is also a disadvantage to be overcome.

To solve the foregoing problems, a novel and efficient touch sensing apparatus is therefore needed.

SUMMARY OF THE INVENTION

One objective of the present invention is to disclose an adaptive sensing apparatus, which is capable of providing different adaptive sampling modes according to different touch operation requirements, so that a set of reduced sensed data can be generated per sensing scan without missing any touch input.

Another objective of the present invention is to disclose an adaptive sensing apparatus, which is capable of providing a periodic skipping sampling mode, so that a set of reduced sensed data can be generated per sensing scan without missing any touch input.

Another objective of the present invention is to disclose an adaptive sensing apparatus, which is capable of generating a periodic skipping sampling mode according to a calibration procedure.

Another objective of the present invention is to disclose an adaptive sensing apparatus, which is capable of providing a sensing-points-combined sampling mode, so that a set of reduced sensed data can be generated per sensing scan without missing any touch input.

Another objective of the present invention is to disclose an adaptive sensing apparatus, which is capable of providing a sensing-points-combined sampling mode for promoting the SNR (signal to noise ratio) of the sensed data.

Still another objective of the present invention is to disclose an adaptive sensing apparatus, which is capable of providing different adaptive sampling modes according to different touch operation requirements, so that a set of reduced sensed data can be generated per sensing scan; and combining multiple sets of the reduced sensed data to form a set of output sensed data, wherein the quantity of the set of output sensed data corresponds to the resolution of a display.

To attain the foregoing objectives, an adaptive sensing apparatus is proposed, the apparatus including:

a sensor array, having N sensing points, wherein N is a positive integer;

a driver unit, coupled with the sensor array; and a control unit, coupled with the driver unit;

wherein the control unit has at least one adaptive sampling mode for controlling the driver unit to drive the sensor array and derive M sensed data, wherein M is a positive integer and M<N.

Each of the at least one adaptive sampling mode is selected from a group consisting of periodic skipping sampling mode, sensing-points-combined sampling mode, and any combination thereof.

The periodic skipping sampling mode determines a skipping distance and/or a sampling region according to a piece of calibration data, and the piece of calibration data is stored in a memory.

The piece of calibration data is predetermined by a default setting or derived via a calibration procedure.

Preferably, the calibration procedure includes detecting a designated touch operation.

The designated touch operation requires a finger or a palm to touch a designated region, slide in a designated region, or approach a designated region from above.

Besides, the piece of calibration data can come from a central processing unit.

The piece of calibration data is generated according to a hardware performance of the central processing unit or a software operation requirement.

The hardware performance includes the operation processing speed of the central processing unit.

The software operation requirement is defined by an APP (application program).

The control unit can be implemented by a micro controller or integrated into the central processing unit.

The central processing unit can be a GPU (graphics processing unit).

To attain the foregoing objectives, another adaptive sensing apparatus is proposed, the apparatus including:

a sensor array, having N sensing points, wherein N is a positive integer;

a driver unit, coupled with the sensor array; and a control unit, coupled with the driver unit;

wherein the control unit is used for executing the steps of:

controlling the driver unit according to an adaptive sampling mode to drive the sensor array;

deriving M sensed data from the sensor array, wherein M is a positive integer and M<N; and delivering the M sensed data to a central processing unit.

Each of the at least one adaptive sampling mode is selected from a group consisting of periodic skipping sampling mode, sensing-points-combined sampling mode, and any combination thereof.

The periodic skipping sampling mode determines a skipping distance and/or a sampling region according to a piece of calibration data, and the piece of calibration data is stored in a memory.

The piece of calibration data is predetermined by a default setting or derived via a calibration procedure.

Preferably, the calibration procedure includes detecting a designated touch operation.

The designated touch operation requires a finger or a palm to touch a designated region, slide in a designated region, or approach a designated region from above.

Besides, the piece of calibration data can come from a central processing unit.

The piece of calibration data is generated according to a hardware performance of the central processing unit or a software operation requirement.

The hardware performance includes the operation processing speed of the central processing unit.

The software operation requirement is defined by an APP (application program).

The control unit can be implemented by a micro controller or integrated into the central processing unit.

The central processing unit can be a GPU (graphics processing unit).

To attain the foregoing objectives, still another adaptive sensing apparatus is proposed, the apparatus including:

a sensor array, having N sensing points, wherein N is a positive integer;

a driver unit, coupled with the sensor array; and a control unit, coupled with the driver unit;

wherein the control unit is used for executing the steps of:

controlling the driver unit according to an adaptive sampling mode to drive the sensor array;

deriving M sensed data from the sensor array, wherein M is a positive integer and M<N;

combining multiple sets of the M sensed data to form a set of output sensed data; and delivering the set of output sensed data to a central processing unit.

Preferably, the quantity of the set of output sensed data corresponds to the resolution of a display.

To make it easier for our examiner to understand the objective of the invention, its structure, innovative features, and performance, we use preferred embodiments together with the accompanying drawings for the detailed description of the invention.

BRIEF DESCRIPTION OF THE DRAWINGS

FIG. 3 is an illustrative diagram for an embodiment of the adaptive sampling mode disclosed in FIG. 2.

FIG. 4(a)-4(d) are illustrative diagrams for another embodiment of the adaptive sampling mode disclosed in FIG. 2.

DETAILED DESCRIPTION OF THE PREFERRED EMBODIMENTS

The present invention will be described in more detail hereinafter with reference to the accompanying drawings that show the preferred embodiments of the invention.

Figure 1:
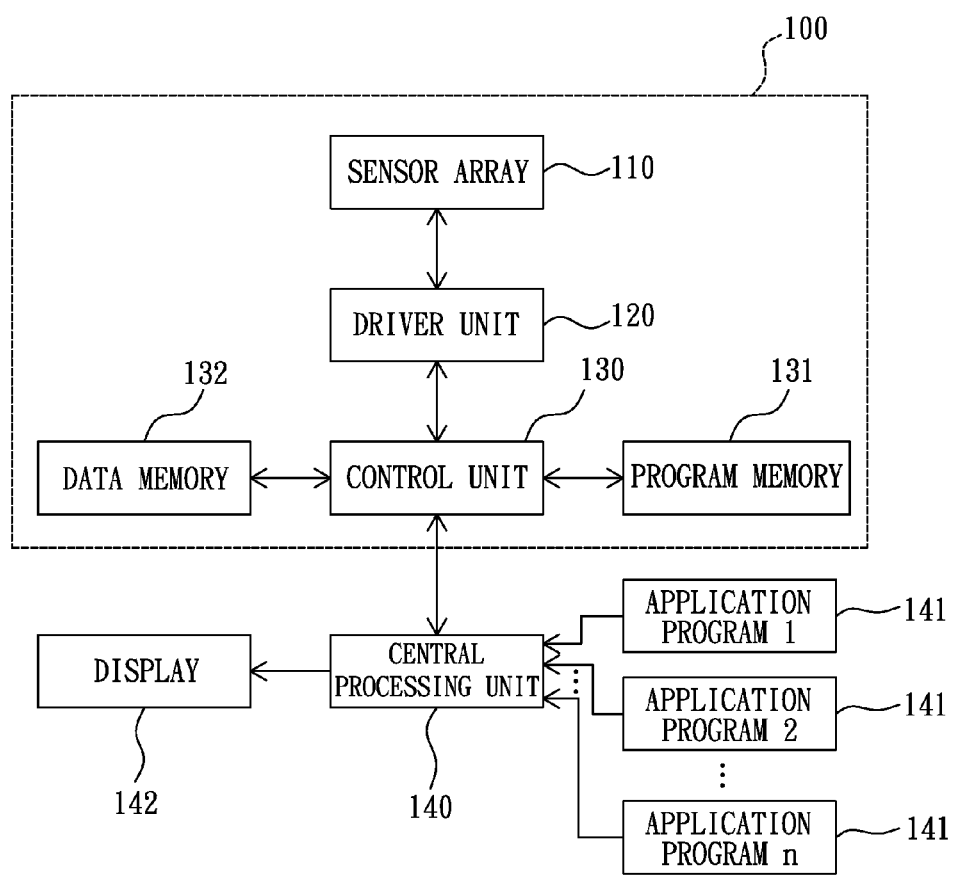
FIG. 1 illustrates the block diagram of a sensing system including an adaptive sensing apparatus of the present invention.

Please refer to FIG. 1, which illustrates the block diagram of a sensing system including an adaptive sensing apparatus of the present invention. As illustrated in FIG. 1, the sensing system includes an adaptive sensing apparatus 100, a central processing unit 140, a plurality of application programs 141, and a display 142, wherein the adaptive sensing apparatus 100 has a sensor array 110, a driver unit 120, a control unit 130, a program memory 131, and a data memory 132.

The sensor array 110 can be a capacitive touch sensor array, an optical image sensing array, a radio image sensing array, an acoustic wave sensing array, an electromagnetic sensing array, a piezoelectrical sensing array, a thermal sensing array, a signal interruption sensing array, a switch array type sensing array, or any combination thereof.

The driver unit 120 is coupled with the sensor array 110 to drive the sensor array 110 to scan a touch plane. The driver unit 120 generally includes a multiplexer, an analog signal processing unit, and a timer/counter (not illustrated in the figure).

Figure 2:
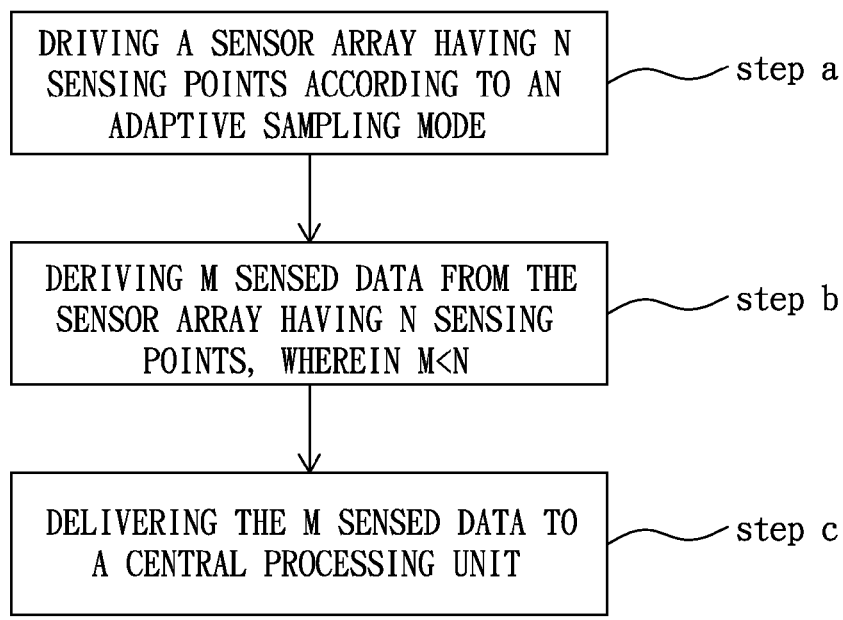
FIG. 2 illustrates the flow chart of a preferred embodiment of an adaptive sensing method implemented by the control unit in FIG. 1.

The control unit 130, coupled with the driver unit 120, is used for executing a program—stored in the program memory 131—to control the driver unit 120 to drive the sensor array 110, and thereby realize an adaptive sensing method. Please refer to FIG. 2, which illustrates a preferred embodiment of the adaptive sensing method. As illustrated in FIG. 2, the adaptive sensing method includes the steps of: driving a sensor array having N sensing points according to an adaptive sampling mode (step a); deriving M sensed data from the sensor array having N sensing points, wherein M<N (step b); and delivering the M sensed data to a central processing unit (step c).

Figure 3:
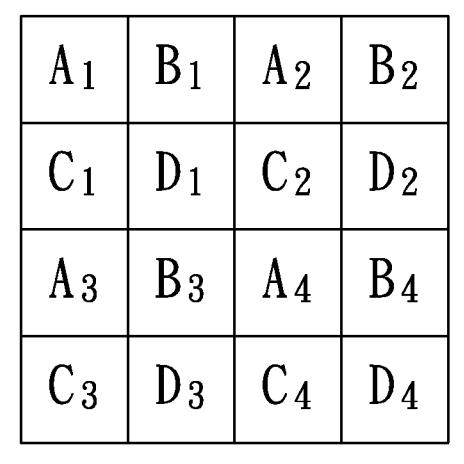

The adaptive sampling mode can be a periodic skipping sampling mode, a sensing-points-combined sampling mode, or any combination thereof. Please refer to FIG. 3, which is an illustrative diagram for the periodic skipping sampling mode. As illustrated in FIG. 3, the periodic skipping sampling mode can sample a sensing plane in an order of A1, A2, A3, A4, or in an order of B1, B2, B3, B4, or in an order of C1, C2, C3, C4, or in an order of D1, D2, D3, D4. In this illustration, N=16, M=4.

Please refer to FIG. 4(a)-FIG. 4(d), which illustrate the sensing-points-combined sampling mode. As illustrated in FIG. 4(a), there are two objects indicated by X in a 4×4 two-dimensional space. As illustrated in FIG. 4(b), the present invention uses a sensing-points-combined mode to divide the 4×4 two-dimensional space into 4 first sub spaces for detecting the objects, and a set of first sensed data is derived and two first locked spaces are generated accordingly. As illustrated in FIG. 4(c), the present invention further divides each of the two first locked spaces into 4 second sub spaces for detecting the objects, and a set of second sensed data is derived and two second locked spaces are generated accordingly. As illustrated in FIG. 4(d), the present invention finally combines the first sensed data with the second sensed data to form a set of output sensed data—having 8 data. In this illustration, N=16, M=8. The sensing-points-combined sampling mode not only can reduce sampling data quantity, but can make the output sensed data possess high SNR (signal to noise ratio)—because sensing-points-combined can provide an effect similar to a low pass filtering.

Besides, the periodic skipping sampling mode can determine a skipping distance and/or a sampling region according to a piece of calibration data—stored in the data memory 132, and the piece of calibration data can be predetermined by a default setting or derived via a calibration procedure. The calibration procedure preferably includes detecting a designated touch operation.

Figure 5A:
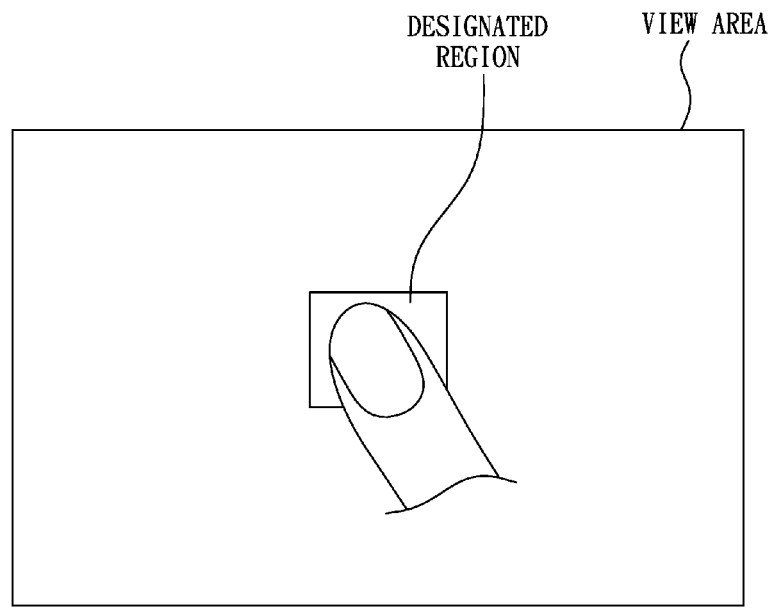
FIG. 5(a) illustrates a preferred embodiment of a designated touch operation.

Please refer to FIG. 5(a), which illustrates a preferred embodiment of the designated touch operation. As illustrated in FIG. 5(a), the preferred embodiment requires a user to touch a designated region of a view area of the display 142 with a finger. The sensing system will detect an area covered by the finger in the designated region to determine the skipping distance. As the multiple sensing points in the area covered by the finger correspond to same touch event, therefore, the larger the area covered by the finger is, the longer the skipping distance can be.

Figure 5B:
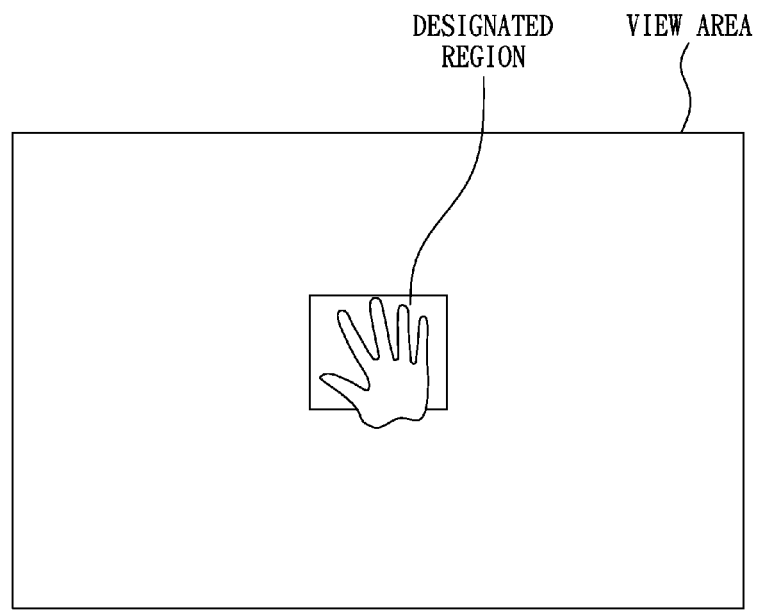
FIG. 5(b) illustrates another preferred embodiment of the designated touch operation.

FIG. 5(b) illustrates another preferred embodiment of the designated touch operation. As illustrated in FIG. 5(b), the preferred embodiment requires a user to touch a designated region of a view area of the display 142 with a palm. The sensing system will detect an area covered by the palm in the designated region to determine the skipping distance. As the multiple sensing points in the area covered by the palm correspond to same touch event, therefore, the larger the area covered by the palm is, the longer the skipping distance can be.

Figure 6A:
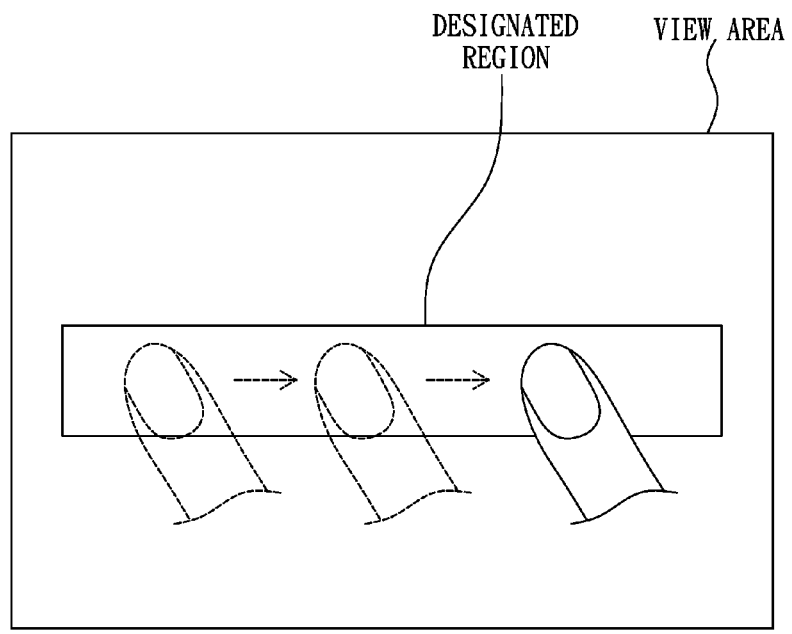
FIG. 6(a) illustrates another preferred embodiment of the designated touch operation.

FIG. 6(a) illustrates still another preferred embodiment of the designated touch operation. As illustrated in FIG. 6(a), the preferred embodiment requires a user to use a finger to slide on a designated region of a view area of the display 142. The sensing system will detect a sliding speed of the finger in the designated region to determine the skipping distance. As when the finger slides faster, the traveling distance of the finger in a unit time will be longer, therefore, the skipping distance can be set proportional to the sliding speed of the finger.

Figure 6B:
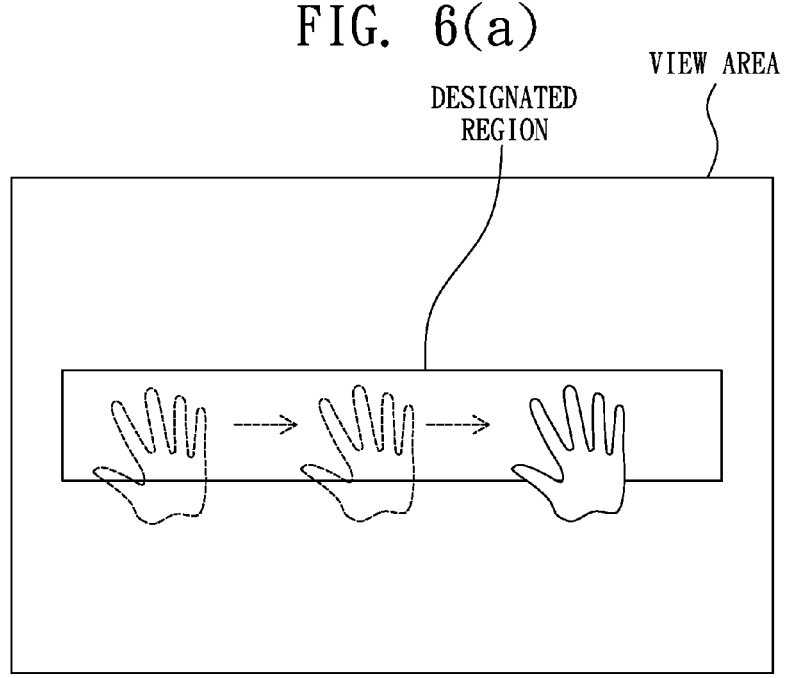
FIG. 6(b) illustrates another preferred embodiment of the designated touch operation.

FIG. 6(b) illustrates still another preferred embodiment of the designated touch operation. As illustrated in FIG. 6(b), the preferred embodiment requires a user to use a palm to slide on a designated region of a view area of the display 142. The sensing system will detect a sliding speed of the palm in the designated region to determine the skipping distance. As when the palm slides faster, the traveling distance of the palm in a unit time will be longer, therefore, the skipping distance can be set proportional to the sliding speed of the palm.

Figure 7A:
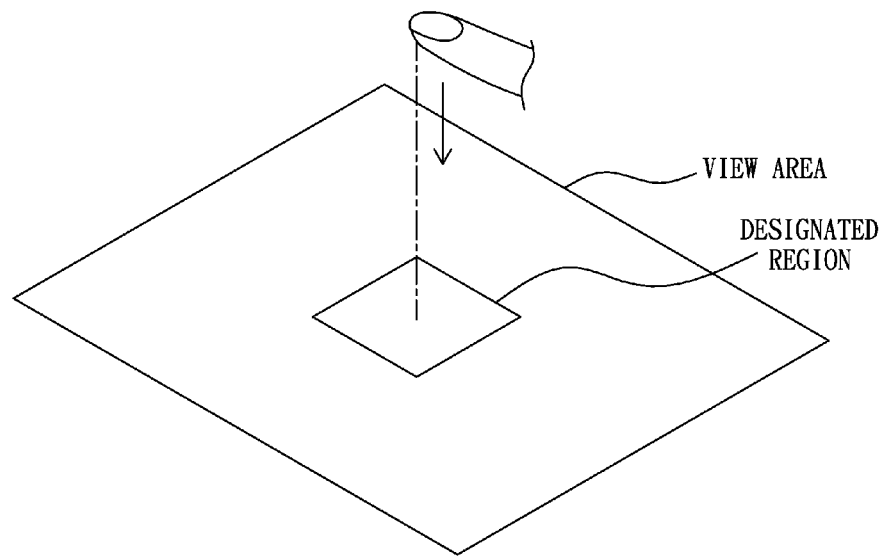
FIG. 7(a) illustrates another preferred embodiment of the designated touch operation.

FIG. 7(a) illustrates still another preferred embodiment of the designated touch operation. As illustrated in FIG. 7(a), the preferred embodiment requires a user to use a finger to approach a designated region of a view area of the display 142 from above. The sensing system will detect an approaching speed of the finger to determine the skipping distance. As when the approaching speed of the finger is higher, the traveling distance of the finger in a unit time will be longer, therefore, the skipping distance can be set proportional to the approaching speed of the finger.

Figure 7B:
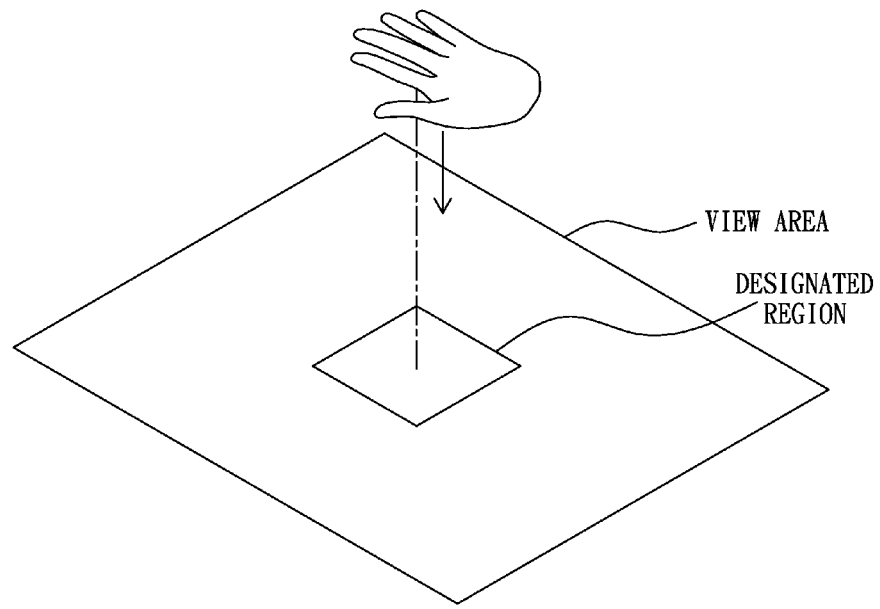
FIG. 7(b) illustrates still another preferred embodiment of the designated touch operation.

FIG. 7(b) illustrates still another preferred embodiment of the designated touch operation. As illustrated in FIG. 7(b), the preferred embodiment requires a user to use a palm to approach a designated region of a view area of the display 142 from above. The sensing system will detect an approaching speed of the palm to determine the skipping distance. As when the approaching speed of the palm is higher, the traveling distance of the palm in a unit time will be longer, therefore, the skipping distance can be set proportional to the approaching speed of the palm.

Besides, the piece of calibration data can come from the central processing unit 140, which can be a GPU (graphics processing unit). In one embodiment, the piece of calibration data can be generated according to a hardware performance of the central processing unit 140. For example, determine the skipping distance according to the operation processing speed of the central processing unit 140—the lower the operation processing speed, the longer the skipping distance. In another embodiment, the piece of calibration data can be generated according to a software operation requirement of the central processing unit 140. For example, determine the skipping distance and the sampling region according to an APP 141 of the central processing unit 140. For example, when the APP 141 only provides touch operation functions in a specific region of a view area of the display 142, the present invention can perform sampling only on the specific region to prevent waste of resources.

Besides, as the performance of the central processing unit 140 is generally higher than that of the control unit 130, therefore, the control unit 130 not only can be implemented by a micro controller, but can be integrated into the central processing unit 140—that is, using the central processing unit 140 to execute a program to realize the adaptive sensing method.

Figure 8:
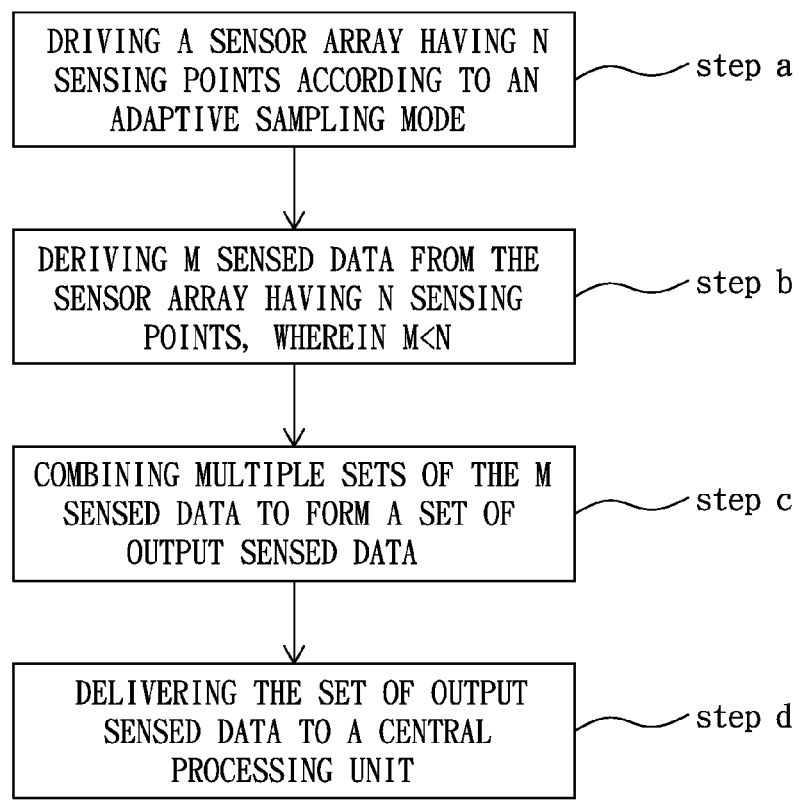
FIG. 8 illustrates the flow chart of another preferred embodiment of the adaptive sensing method implemented by the control unit in FIG. 1.

Another preferred embodiment of the adaptive sensing method is illustrated in FIG. 8. As can be seen in FIG. 8, the adaptive sensing method includes the steps of: driving a sensor array having N sensing points according to an adaptive sampling mode (step a); deriving M sensed data from the sensor array having N sensing points, wherein M<N (step b); combining multiple sets of the M sensed data to form a set of output sensed data (step c); and delivering the set of output sensed data to a central processing unit (step d).

The adaptive sampling mode can be a periodic skipping sampling mode, a sensing-points-combined sampling mode, or any combination thereof. As the principles of the periodic skipping sampling mode and the sensing-points-combined sampling mode have been elaborated above, they will not be readdressed here.

Besides, the periodic skipping sampling mode can determine a skipping distance and/or a sampling region according to a piece of calibration data—stored in the data memory 132, and the piece of calibration data can be predetermined by a default setting or derived via a calibration procedure. The calibration procedure preferably includes detecting a designated touch operation. The designated touch operation includes the options of:

1. Require a user to touch a designated region of a view area of the display 142 with a finger or a palm. The sensing system will detect an area covered by the finger or the palm in the designated region to determine the skipping distance. As the multiple sensing points in the area covered by the finger or the palm correspond to same touch event, therefore, the larger the area covered by the finger or the palm is, the farer the skipping distance can be.

2. Require a user to use a finger or a palm to slide on a designated region of a view area of the display 142. The sensing system will detect a sliding speed of the finger or the palm in the designated region to determine the skipping distance. As when the finger or the palm slides faster, the traveling distance of the finger or the palm in a unit time will be longer, therefore, the skipping distance can be set proportional to the sliding speed of the finger or the palm.

3. Require a user to use a finger or a palm to approach a designated region of a view area of the display 142 from above. The sensing system will detect an approaching speed of the finger or the palm to determine the skipping distance. As when the approaching speed of the finger or the palm is higher, the traveling distance of the finger or the palm in a unit time will be longer, therefore, the skipping distance can be set proportional to the approaching speed of the finger or the palm.

Besides, the piece of calibration data can come from the central processing unit 140. In one embodiment, the piece of calibration data can be generated according to a hardware performance of the central processing unit 140. For example, determine the skipping distance according to the operation processing speed of the central processing unit 140—the lower the operation processing speed, the longer the skipping distance. In another embodiment, the piece of calibration data can be generated according to a software requirement of the central processing unit 140. For example, determine the skipping distance and the sampling region according to an APP 141 of the central processing unit 140. For example, when the APP 141 only provides touch operation functions in a specific region of a view area of the display 142, the present invention can perform sampling only on the specific region to prevent waste of resources.

In addition, the data quantity of the set of output sensed data corresponds to the resolution of the display 142. That is, in this preferred embodiment, the present invention generates a set of low-quantity sensed data per scan, and combines multiple sets of the low-quantity sensed data to form the set of output sensed data. As a result, the sensing apparatus of the present invention can apply to displays of different resolutions.

Thanks to the novel design elaborated above, the present invention possesses the following advantages:

1. The adaptive sensing apparatus of the present invention can provide different adaptive sampling modes according to different touch operation requirements, so that a set of reduced sensed data can be generated per sensing scan without missing any touch input.

2. The adaptive sensing apparatus of the present invention can provide a periodic skipping sampling mode, so that a set of reduced sensed data can be generated per sensing scan without missing any touch input.

3. The adaptive sensing apparatus of the present invention can generate a periodic skipping sampling mode according to a calibration procedure.

4. The adaptive sensing apparatus of the present invention can provide a sensing-points-combined sampling mode, so that a set of reduced sensed data can be generated per sensing scan without missing any touch input.

5. The adaptive sensing apparatus of the present invention can provide a sensing-points-combined sampling mode for promoting the SNR (signal to noise ratio) of the sensed data.

6. The adaptive sensing apparatus of the present invention can provide different adaptive sampling modes according to different touch operation requirements, so that a set of reduced sensed data can be generated per sensing scan; and combine multiple sets of the reduced sensed data to form a set of output sensed data, wherein the data quantity of the set of output sensed data corresponds to the resolution of a display.

In conclusion, the adaptive sensing apparatus of the present invention is capable of providing different adaptive sampling modes according to different touch operation requirements, so as to reduce the data quantity of the sensed data and promote SNR of the sensed data efficiently. Therefore, the adaptive sensing apparatus of the present invention has superior performance over the conventional sensing apparatuses.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. An adaptive sampling apparatus for spatial plane-based sampling corresponding to coverage of a user's contact with a touch screen display during a touch event, comprising:
a touch sensor array, having a plurality of N sensing points whereby multiple points within a predetermined two-dimensional portion of a touch screen display are simultaneously sensed, wherein N is a positive integer;
a driver unit, coupled with said sensor array; and
a control unit, coupled with said driver unit;
wherein said control unit has at least one adaptive sampling mode for controlling said driver unit to drive M regions determined according to an area corresponding with said coverage of a user's contact with a touch screen display sensed by the N touch sensing points of said sensor array and derive M sensed data from said M regions, wherein M is a positive integer and M<N, and each of said M regions includes at least one of said N touch sensing points, wherein said at least one of said N touch sensing points are combined to form one joined sensing unit for touch sensing whereby M is adaptable to said area corresponding with coverage of a user's contact with a touch screen display area during said touch event, and wherein said control unit operates in said at least one adaptive sampling mode selected from a group consisting of a spatially skipping sampling mode wherein each of said M regions has only one touch sensing point thereof activated for touch sensing, and a sensing-points-combined sampling mode wherein each of said M regions has all touch sensing points therein.

2. The adaptive sampling apparatus of claim 1, wherein each of said at least one adaptive sampling mode is any combination of said spatially skipping sampling mode and said sensing-points combined sampling mode.

3. The adaptive sampling apparatus of claim 2, wherein said spatially skipping sampling mode determines a skipping distance and/or sampling region according to a piece of calibration data, and said piece of calibration data is stored in a memory.

4. The adaptive sampling apparatus of claim 3, wherein said piece of calibration data is predetermined by a default setting or derived via a calibration procedure.

5. The adaptive sampling apparatus of claim 4, wherein said calibration procedure includes detecting a designated touch operation, and said designated touch operation requires a finger or a palm to touch a designated region, slide in a designated region, or approach a designated region, slide in a designated region, or approach a designated region from above.

6. The adaptive sampling apparatus of claim 3, wherein said piece of calibration data is provided by a central processing unit.

7. The adaptive sampling apparatus of claim 6, wherein said piece of calibration data is generated according to an operation processing speed of said central processing unit, or an operation requirement of an operation program.

8. The adaptive sampling apparatus of claim 6, wherein said control unit is implemented by a micro controller or integrated into said central processing unit.

9. The adaptive sampling apparatus of claim 8, wherein said central processing unit is a graphics processing unit.

10. An adaptive sampling apparatus for spatial plane-based sampling corresponding to coverage of a user's contact with a touch screen display of an electronic device during a touch event, comprising:

a touch sensor array, having a plurality of N touch sensing points whereby multiple points within a predetermined two-dimensional portion of a touch screen display are simultaneously sensed, wherein N is a positive integer;

a driver unit, coupled with said sensor array;

a control unit, coupled with said driver unit; wherein said control unit is used for executing the steps of controlling said driver unit according to an adaptive sampling mode to drive M regions determined according to an area corresponding with said coverage of a user's contact with a touch screen display sensed by the N sensing points of said sensor array, wherein each of said M regions includes at least one of said N touch sensing points, wherein said at least one of said N touch sensing points are combined to form one joined sensing unit for touch sensing and M is adaptable to said area corresponding with said coverage of a user's contact with a touch screen display during said touch event, and wherein said control unit operates in said at least one adaptive sampling mode selected from a group consisting of a spatially skipping sampling mode wherein each of said M regions has only one touch sensing point thereof activated for touch sensing, and a sensing-points-combined sampling mode wherein each of said M regions has all touch sensing points therein;

deriving M sensed data from said touch sensor array, wherein M is a positive integer and M<N; and delivering said M sensed data to a central processing unit.

11. The adaptive sampling apparatus of claim 10, wherein said adaptive sampling mode is any combination of said spatially skipping sampling mode and said sensing-points combined sampling mode.

12. The adaptive sampling apparatus of claim 11, wherein said spatially skipping sampling mode determines a skipping distance and/or sampling region according to a piece of calibration data, and said piece of calibration data is stored in a memory.

13. The adaptive sampling apparatus of claim 12, wherein said piece of calibration data is predetermined by a default setting or derived via a calibration procedure.

14. The adaptive sampling apparatus of claim 13, wherein said piece of calibration procedure includes detecting a designated touch operation, and said designated touch operation requires a finger or palm to touch a designate region, slide in a designated region, or approach a designated region from above.

15. The adaptive sampling apparatus of claim 12, wherein said piece of calibration data is provided by said central processing unit.

16. The adaptive sampling apparatus of claim 15, wherein said piece of calibration data is generated according to an operation processing speed of said central processing unit, or an operation requirement of an application program.

17. The adaptive sampling apparatus of claim 10, wherein said control unit is implemented by a micro controller or integrated into said central processing unit.

18. The adaptive sampling apparatus of claim 17, wherein said central processing unit is a graphics processing unit.

19. An adaptive sampling apparatus for spatial plane-based sampling corresponding to coverage of a user's contact with a touch screen display of an electronic device during a touch event, comprising:

a touch sensor array, having a plurality of N touch sensing points whereby multiple points within a predetermined two-dimensional portion of a touch screen display are simultaneously sensed, wherein N is a positive integer;

a driver unit, coupled with said sensor array;

a control unit, coupled with said driver unit; wherein said control unit is used for executing the steps of controlling said driver unit according to an adaptive sampling mode to drive M regions determined according to an area corresponding with said coverage of a user's contact with a touch screen display sensed by the N sensing points of said sensor array, wherein each of said M regions includes at least one of said N touch sensing points, wherein said at least one of said N touch sensing points are combined to form one joined sensing unit for touch sensing and M is adaptable to said area corresponding with said coverage of a user's contact with a touch screen display during said touch event, wherein said control unit operates in said at least one adaptive sampling mode selected from a group consisting of a spatially skipping sampling mode wherein each of said M regions has only one touch sensing point thereof activated for touch sensing, and a sensing-points-combined sampling mode wherein each of said M regions has all touch sensing points therein;

deriving M sensed data from said touch sensor array, wherein M is a positive integer and M<N;

combining multiple sets of said M sensed data to form a set of output sensed data; and delivering said M sensed data to a central processing unit.

20. The adaptive sampling apparatus of claim 19, wherein the data quantity of said set of output sensed data corresponds to the resolution of a display.

* * * * *